United States Patent [19]

Riley

[11] Patent Number: 4,662,380

[45] Date of Patent: May 5, 1987

[54] ADAPTIVE TIME GAIN COMPENSATION SYSTEM FOR ULTRASOUND IMAGING

[75] Inventor: James K. Riley, Davis, Calif.

[73] Assignee: General Electric Company, Milwaukee, Wis.

[21] Appl. No.: 795,071

[22] Filed: Oct. 31, 1985

[51] Int. Cl.⁴ .............................................. A61B 10/00
[52] U.S. Cl. ....................................... 128/660; 73/631
[58] Field of Search .................. 128/660, 661; 73/599, 73/602, 631

[56] References Cited

U.S. PATENT DOCUMENTS

| 4,043,181 | 8/1977 | Nigam | 128/660 X |
| 4,432,236 | 2/1984 | Nogasaki | 73/631 |
| 4,512,350 | 4/1985 | Cimilluca | 73/631 X |

Primary Examiner—Kyle L. Howell
Assistant Examiner—Francis J. Jaworski
Attorney, Agent, or Firm—Flehr, Hohbach, Test, Albritton & Herbert

[57] ABSTRACT

A gain control system for use in an ultrasound imaging system includes a histogram analyzer for identifying image pixel populations attributable to fluid, soft tissue, specular reflectors and artifacts. The histogram analyzer establishes mean peak values. Nulls between image populations are identified for setting gain versus depth break points. A comparator uses a threshold level to compare image information corresponding to soft tissue. A TGC generator responds to a preselected slope, a brightness level, and the tissue identification to generate a time gain control signal.

3 Claims, 7 Drawing Figures

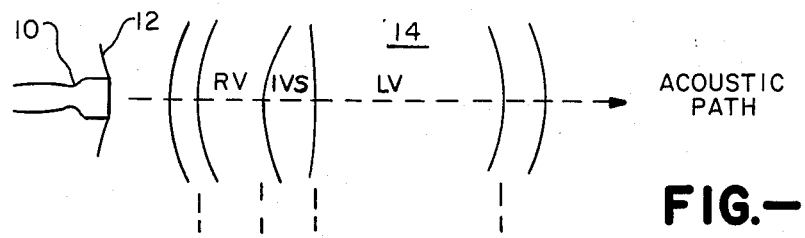
FIG.—1A
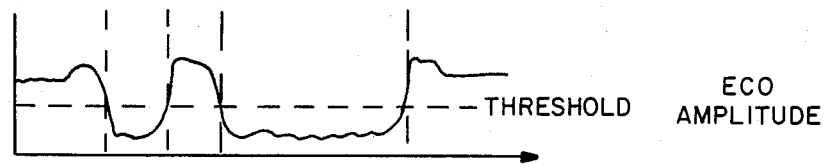
FIG.—1B
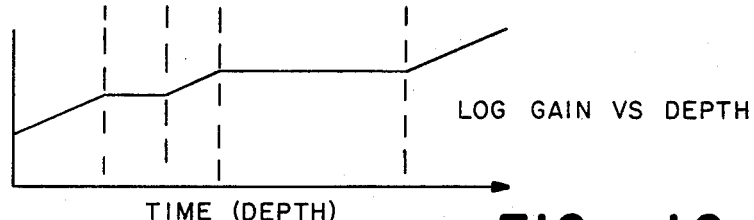
FIG.—1C
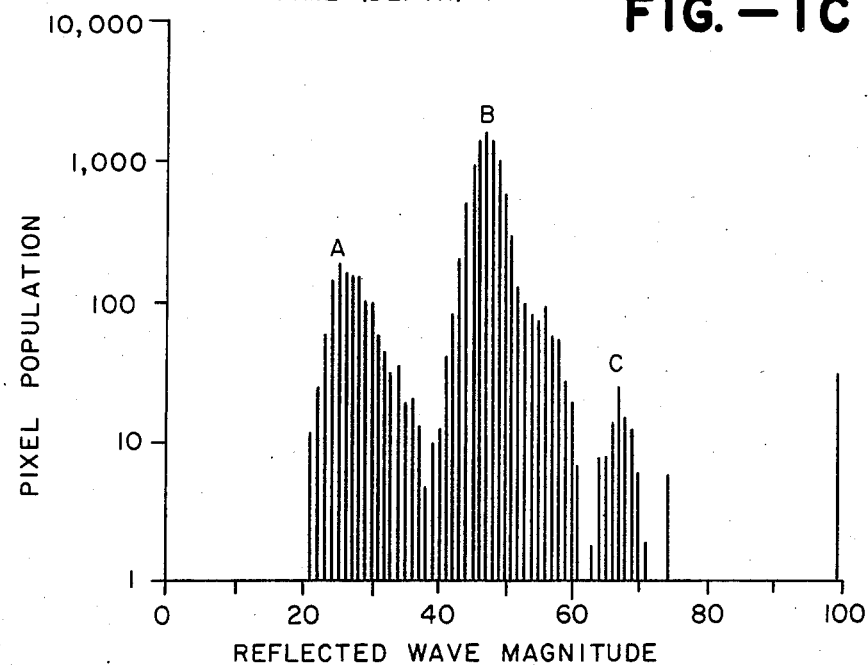
FIG.—2

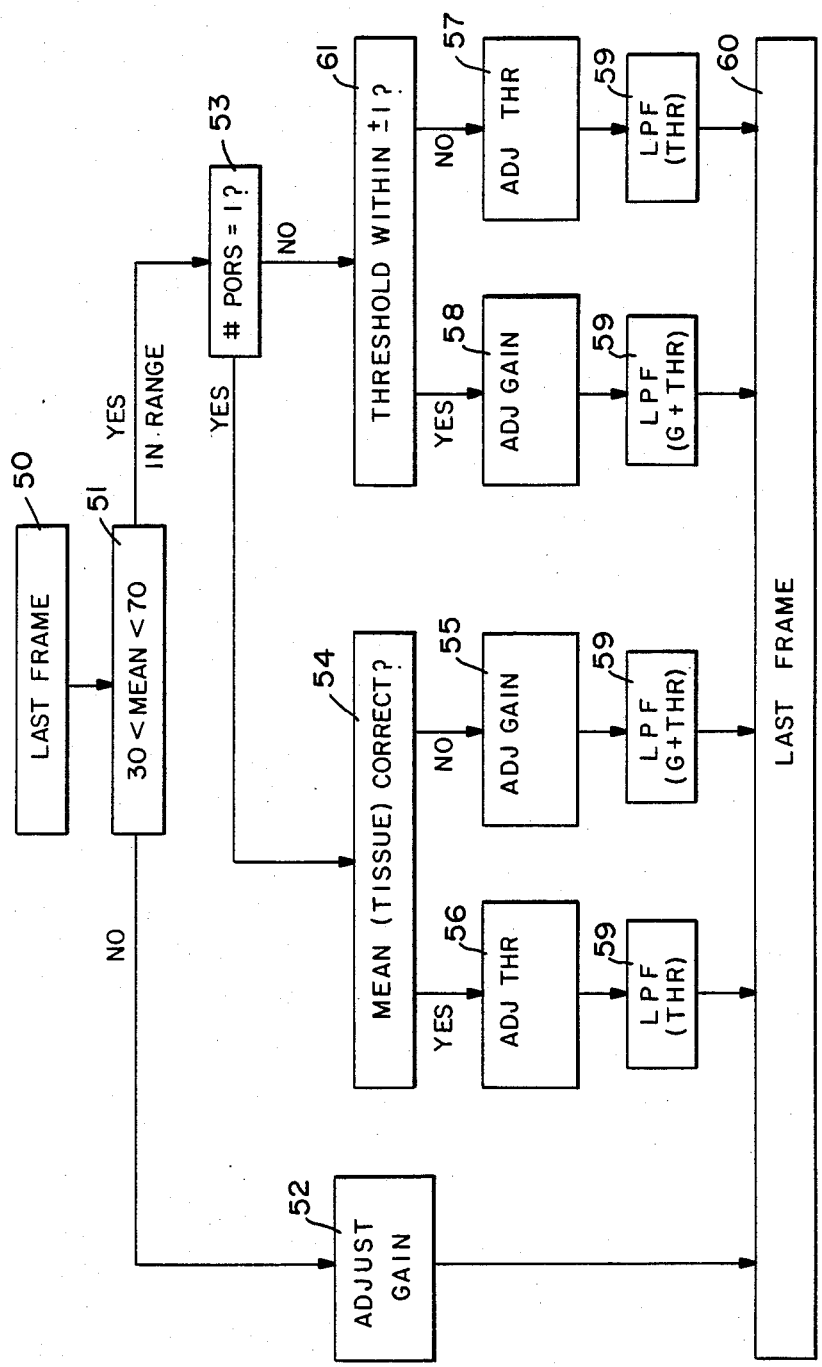
FIG. —5

ADAPTIVE TIME GAIN COMPENSATION SYSTEM FOR ULTRASOUND IMAGING

This invention relates generally to ultrasound imaging, and more particularly the invention relates to attenuation compensation and gain control in ultrasound imaging systems.

The formation of two-dimensional images through pulse echo ultrasonic interrogation of biological tissues entails the use of an electronic receiver with a means of varying the amplitude gain applied to return echos in response to the attenuation of the ultrasound waves over the propagation and reflection paths and to adjust for variations of transducer sensitivity and the scattering efficiency of tissue in the imaging subjects. The conventional approach for controlling the variable gain employs manual controls for entering the shape of the gain versus depth function for attenuation compensation and a manual system gain control for adjusting the mean gray level of the image.

The conventional time gain compensation approach, however, uses the same gain versus depth function for every beam line vector in the two-dimensional image. Variations in the tissue geometry over the field of view can therefore cause errors in the attenuation correction. The problem is most acute in cases where the beam passes through alternating reqions of tissue and fluid such as in imaging the heart where the fluid is blood and in imaging the fetus where both material urine and amniotic fluid present non-attenuative path segments of variable length. Accurate attenuation compensation in these cases can only be accomplished by generating unique gain versus depth functions for all beam paths and causing each function to match the geometry of the tissue along its individual path.

Heretofore it has been proposed that a variable gain versus depth function be generated by comparing an incoming echo signal to a fixed threshold value set by the operator. See Melton and Skorton, "Rational-Gain-Compensation for Attenuation in Ultrasonic Cardiac Imaging", 1981 IEEE Ultrasonics Symposium, pp. 607–611. For all times when the echo signal exceeds the threshold, the gain is increased at a predetermined rate. The gain is held constant for all times when the echo level is below the threshold.

The present invention is directed to a feedback control system in which the threshold level is determined by analysis of the echo level histogram taken over the previous image frame. In carrying out the invention the mean image pixel population level is identified for soft tissue in controlling system gain, and nulls between image populations of fluid and soft tissue are identified for setting gain versus depth breakpoints.

In a preferred embodiment a closed loop servo control is provided including a histogram buffer for receiving and storing image data for a previous image frame and a histogram analyzer connected to receive the image data from the buffer and identify image pixel populations attributable to fluid, image pixel population attributable to soft tissue, image pixel population attributable to specular reflectors, and image pixel population attributable to artifacts. A feedback controller is connected to receive the mean pixel values and threshold levels and provide amplifier gain and threshold levels based on the mean pixel values and an adjusted threshold. The threshold is applied to a comparator which compares the threshold to image information for the present frame for controlling changes in gain.

The invention and objects and features thereof will be more readily apparent from the following detailed description and appended claims when taken with the drawing, in which:

FIGS. 1A–1C are correlated plots of echo amplitude and log gain versus depth for the acoustic path in which an ultrasonic wave passes.

FIG. 2 is a histogram showing pixel population and echo amplitude.

FIG. 5 is a flow diagram illustrating operation of the feedback controller in FIG. 3.

Figure 3:
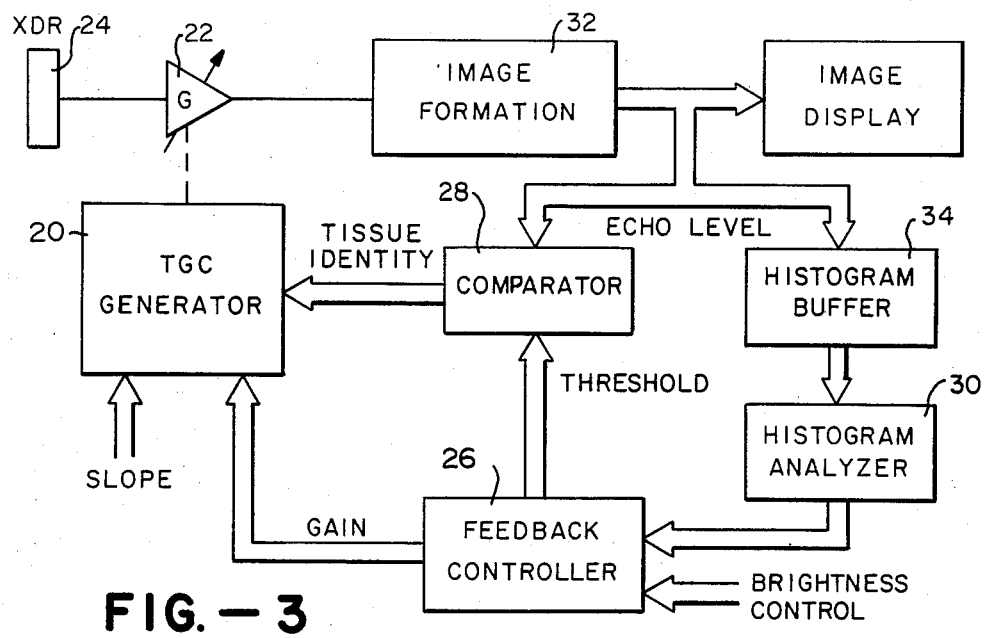
FIG. 3 is a functional block diagram of a gain control system for use with an ultrasound imaging system in accordance with the invention.

Referring now to the drawings, FIGS. 1A–1C respectively illustrate the acoustic path of an ultrasonic wave, echo amplitude of the reflected wave, and a plot of log gain versus depth for controlling the amplification of the reflected wave and offset tissue attenuation thereof. In FIG. 1A a transducer 10 directs an ultrasonic wave through the scan interface 12 into a volume 14 and receives reflections therefrom. FIG. 1B indicates the reflected wave and a threshold valve, and FIG. 1C is a plot of log gain versus depth for the gain of an amplifier for the reflected wave. In the regions of the reflected wave which are below the threshold value the gain is held constant, and only in the regions where the reflected wave exceeds the threshold value is the gain increased according to a selected slope. FIGS. 1A–1C illustrate the adaptive attenuation correction as disclosed by Milton and Skorton wherein a variable gain versus depth function is generated by comparing an incoming echo signal to a fixed threshold value set by the operator.

FIG. 2 illustrates an extension of the technique illustrated by FIGS. 1A–1C which is used in the present invention. In FIG. 2 an echo level histogram is established for an image signal pixel population versus signal amplitude. For example, the pixel population A occurs at a low signal amplitude and corresponds to reflections from fluid, the population level B provides higher reflection amplitudes corresponding to soft tissue, and population level C provides higher reflection magnitudes and corresponding to hard specular reflections. The control system in accordance with the invention provides the mean level of population B to an operator selectable "image brightness" level by feedback control of system gain and uses the null between populations A and B as the threshold value for the comparator that sets the gain versus depth function breakpoints.

FIG. 3 is a functional block diagram of the adaptive time gain compensation system in accordance with one embodiment of the invention. The time gain control (TGC) generator 20 produces the gain versus depth function in controlling variable gain amplifer 22 which amplifies the electrical signals from transducer 24 in response to received ultrasonic wave echos. The TGC generator 20 produces the gain versus depth function using a value of gain from a feedback controller 26, a manually selected slope value, and the "tissue identity" points of breakpoints generated by a comparator 28. The threshold and gain values are generated by analysis of the histogram of the previous image frame in histogram analyzer 30. The current line in the image is compensated using the tissue identity points from the previous line in the image.

More particularly, the previous image frame which is provided by image formation circuitry 32 is transmitted through a histogram buffer 34 to the histogram analyzer, and the present image information is provided to comparator 28 which compares the image information with threshold values from feedback controller 26 for providing the breakpoints for tissue identity to the TGC generator 20. TGC generator 20 in turn generates a TGC signal such as illustrated in FIG. 1C in response to the manually selected slope value, the tissue identity points provided by comparator 28, and the gain signal from feedback controller 26.

Figure 4:
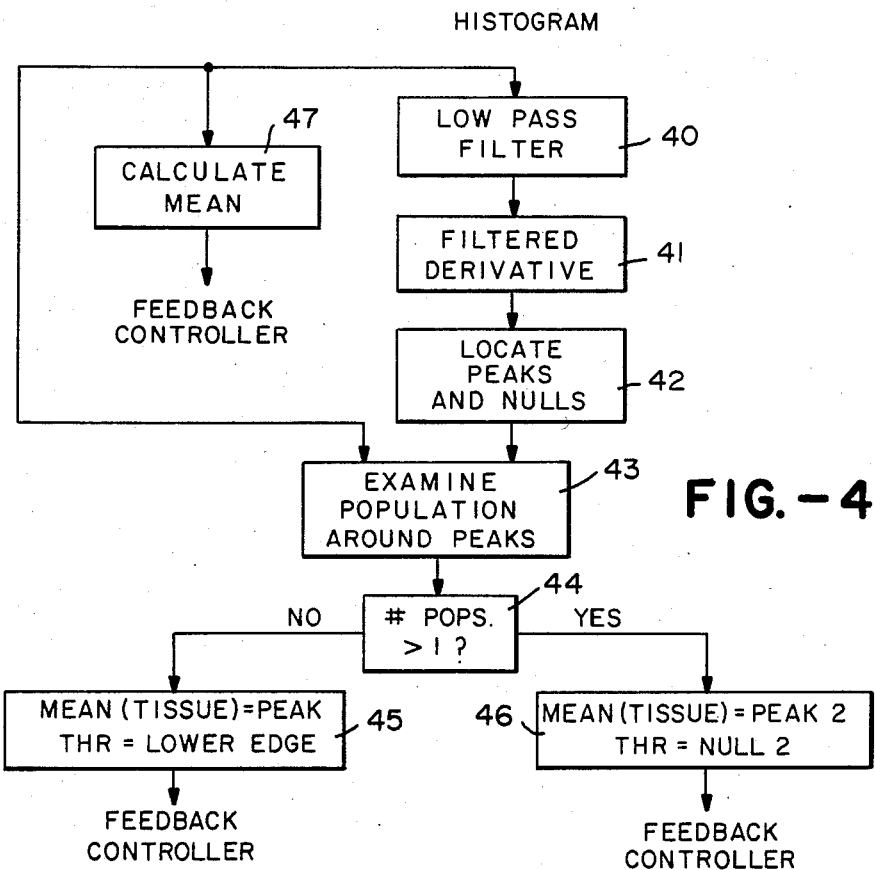
FIG. 4 is a flow diagram of the operation of a histogram analyzer in FIG. 3.

FIG. 4 is a flow diagram of the softwave implemented histogram analyzer 30. The function of the histogram analyzer is to identify the pixel populations attributable to fluid (if any) and soft tissue and to discriminate these from populations generated by specular reflectors (i.e. populations C in FIG. 2) and artifacts. The analyzer also selects the comparator threshold value. Further, should no more than a very few regions of fluid be found in the image field, the analyzer detects this condition and delivers the mean value of the soft tissue population and the location of the lower edge of the population so that the feedback controller can create a conventional, angle independent gain versus depth function. The histogram analyzer operates by surveying a low pass filtered version of the histogram from low pass filter 40 and filtered derivative 41 to locate the main population peaks and nulls as shown at 42 and then test the unfiltered histogram to assess the size of the pixel population around the histogram peaks. Small populations and populations far from the mean of the total histogram as detected at 44 are rejected as artifacts. The mean pixel population value is established at 45 as the population peak, and the lower edge of the population is the magnitude threshold. Any population encompassing a high percentage of the total number of the pixels in the image is taken as the only pixel population and attributed to a homogeneous soft tissue field of view. If more than one pixel population is detected, then the mean tissue population value is set as the second population peak at 46, and the threshold is set equal to the second null. The mean of the total histogram is also calculated by the histogram analyzer to allow the feedback controller to rapidly correct large errors in system gain.

FIG. 5 is a flow diagram of the software implemented feedback controller. This routine is executed after the last image frame is selected at 50. Three main control loops are provided. One, if the mean of the total histogram is out of range as detected at 51, the gain is adjusted in an abrupt step at 56 to compensate. Two, if the mean is in range and only a single population was detected at 53, the gain is adjusted at 54 and 55 so that the "brightness" matches the mean of the population. Once the gain is correct, the threshold is corrected at 56 to reside just below the lower extremity of the population so that a conventional gain versus depth function is executed. Three, if the mean is in range and multiple populations are detected at 53, the threshold is adjusted at 57 if required at 61 to match the value computed from the histogram. Once the threshold is correct, the gain is adjusted at 58 so that the "brightness" matches the mean of the population identified as soft tissue. Low-pass filters 59 are applied to all adjustments of gain threshold to assure stability of the total control system outputs at 60.

There has been described a method and apparatus of adaptive time gain compensation for use in ultrasound imaging. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In an ultrasound imaging system adapted to receive a plurality of temporally related image frames, each frame comprised of signals representative of reflected ultrasonic waves derived from scanning of an image plane in a patient, said system including a gain controlled amplifier and image formation means adapted to produce at least one image based upon said image frames and responsive to signals from the gain controlled amplifier, a gain control system for discriminating between signals from non-attenuating fluid filled regions and signals from attenuating reflective tissue regions comprising means for providing a histogram of a preceding image frame including pixel populations for reflected wave magnitudes;

means responsive to said histogram providing means for identifying a mean pixel population magnitude of soft tissue based on said histogram for controlling gain of the gain controlled amplifier, and means for identifying nulls between pixel populations of fluid and soft tissue in at least one later image based on said histogram for setting gain versus depth breakpoints of said gain control amplifier.

2. The gain control system as defined by claim 1 wherein said means for identifying a mean image population magnitude of soft tissue includes a histogram analyzer connected to receive said histogram of image data, said analyzer comprising means for identifying from said histogram image pixel population attributable to fluid, image pixel population attributable to soft tissue, image pixel population attributable to specular reflectors, and image pixel population attributable to artifacts, said analyzer further comprising means for establishing mean amplitude values of histogram pixel populations for fluid, tissue, and specular reflectors and threshold levels of power, said means for identifying nulls between image populations of fluid and soft tissue for setting gain versus depth breakpoints comprising a feedback control means connected to receive said mean amplitude values and threshold levels from said histogram analyzer and providing amplifier gain and threshold level based on said mean amplitude values in population and threshold levels and providing an adjusted gain output and an adjusted threshold output.

3. The gain control system as defined by claim 2 and further including time gain control signal generator means responsive to said adjusted gain output for controlling the gain of the gain controlled amplifier, comparator means for comparing prior image data and said threshold level and means responsive to said comparator and said feedback controller for controlling gain of said amplifier.

* * * * *